(12) United States Patent
Hamada et al.

(10) Patent No.: US 11,242,578 B2
(45) Date of Patent: Feb. 8, 2022

(54) FERRITE-BASED STAINLESS STEEL SHEET HAVING LOW SPECIFIC GRAVITY AND PRODUCTION METHOD THEREFOR

(71) Applicant: NIPPON STEEL Stainless Steel Corporation, Tokyo (JP)

(72) Inventors: Junichi Hamada, Tokyo (JP); Masatoshi Abe, Tokyo (JP); Atsutaka Hayashi, Tokyo (JP)

(73) Assignee: NIPPON STEEL STAINLESS STEEL CORPORATION, Tokyo (JP)

( * ) Notice: Subject to any disclaimer, the term of this patent is extended or adjusted under 35 U.S.C. 154(b) by 138 days.

(21) Appl. No.: 16/498,220

(22) PCT Filed: Mar. 27, 2018

(86) PCT No.: PCT/JP2018/012311
§ 371 (c)(1),
(2) Date: Sep. 26, 2019

(87) PCT Pub. No.: WO2018/181257
PCT Pub. Date: Oct. 4, 2018

(65) Prior Publication Data
US 2020/0024682 A1 Jan. 23, 2020

(30) Foreign Application Priority Data
Mar. 30, 2017 (JP) .............................. JP2017-069142

(51) Int. Cl.
| | |
|---|---|
| *C22C 38/54* | (2006.01) |
| *C22C 38/48* | (2006.01) |
| *C22C 38/06* | (2006.01) |
| *C22C 38/04* | (2006.01) |
| *C22C 38/42* | (2006.01) |
| *C22C 38/00* | (2006.01) |
| *C22C 38/52* | (2006.01) |
| *C22C 38/46* | (2006.01) |
| *C22C 38/44* | (2006.01) |
| *C22C 38/50* | (2006.01) |
| *C22C 38/02* | (2006.01) |
| *C21D 9/46* | (2006.01) |
| *C21D 8/02* | (2006.01) |
| *C21D 6/00* | (2006.01) |
| *C23G 1/08* | (2006.01) |
| *C22C 38/20* | (2006.01) |
| *C22C 38/22* | (2006.01) |
| *C22C 38/24* | (2006.01) |
| *C22C 38/26* | (2006.01) |
| *C22C 38/28* | (2006.01) |

(Continued)

(52) U.S. Cl.
CPC ............... *C21D 9/46* (2013.01); *C21D 6/002* (2013.01); *C21D 6/005* (2013.01); *C21D 6/007* (2013.01); *C21D 6/008* (2013.01); *C21D 8/0205* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C23G 1/08* (2013.01)

(58) Field of Classification Search
CPC ........ C21D 6/002; C21D 6/005; C21D 6/007; C21D 6/008; C21D 8/0205; C21D 8/0226; C21D 8/0236; C21D 9/46; C22C 38/00; C22C 38/001; C22C 38/002; C22C 38/004; C22C 38/005; C22C 38/008; C22C 38/02; C22C 38/04; C22C 38/06; C22C 38/20; C22C 38/22; C22C 38/24; C22C 38/26; C22C 38/28; C22C 38/30; C22C 38/32; C22C 38/34; C22C 38/38; C22C 38/42; C22C 38/48; C22C 38/50; C22C 38/60; C23G 1/08
See application file for complete search history.

(56) References Cited

U.S. PATENT DOCUMENTS

| | | |
|---|---|---|
| 2005/0028903 A1 | 2/2005 | Fukaya et al. |
| 2012/0014830 A1 | 1/2012 | Hamada et al. |
| 2013/0008573 A1 | 1/2013 | Hamada et al. |

(Continued)

FOREIGN PATENT DOCUMENTS

| | | |
|---|---|---|
| CN | 103348023 A | 10/2013 |
| CN | 103459639 A | 12/2013 |

(Continued)

OTHER PUBLICATIONS

English translation of the Written Opinion of the International Searching Authority for PCT/JP2018/012311 (PCT/ISA/237) dated Jun. 19, 2018.

(Continued)

*Primary Examiner* — Jenny R Wu
(74) *Attorney, Agent, or Firm* — Birch, Stewart, Kolasch & Birch, LLP (57) ABSTRACT

This ferritic stainless steel sheet contains, by mass %: C: 0.001% to 0.020%; Si: 0.01% to 4.00%; Mn: 0.01% to 3.00%; P: 0.010% to 0.040%; S: 0.0001% to 0.0100%; Cr: 10.0% to 15.0%; N: 0.001% to 0.020%; Al: 0.50% to 10.0%; and either one or both of Ti: 0.05% to 0.40% and Nb: 0.05% to 0.40%, with the balance being Fe and unavoidable impurities, in which Cr/(Si+Al) is 10.0 or less, and a specific gravity is 7.6 g/cm³ or less.

3 Claims, 2 Drawing Sheets

(51) Int. Cl.
  *C22C 38/30* (2006.01)
  *C22C 38/32* (2006.01)

(56) References Cited

U.S. PATENT DOCUMENTS

| | | |
|---|---|---|
| 2013/0306204 A1 | 11/2013 | Teraoka et al. |
| 2014/0023550 A1 | 1/2014 | Hamada et al. |
| 2014/0216614 A1 | 8/2014 | Hatano et al. |
| 2015/0218683 A1* | 8/2015 | Nakamura ............ C22C 38/06 420/38 |
| 2017/0073799 A1 | 3/2017 | Nakamura et al. |
| 2017/0107593 A1 | 4/2017 | Hamada et al. |
| 2017/0321310 A1* | 11/2017 | Hatano ............ C22C 38/12 |

FOREIGN PATENT DOCUMENTS

| | | |
|---|---|---|
| CN | 104884657 A | 9/2015 |
| CN | 104975237 A | 10/2015 |
| CN | 105980613 A | 9/2016 |
| CN | 106133166 A | 11/2016 |
| EP | 2902523 A1 | 8/2015 |
| EP | 2987888 A1 | 2/2016 |
| EP | 3176277 A1 | 6/2017 |
| EP | 3342895 A1 | 7/2018 |
| JP | 3474829 B2 | 12/2003 |
| JP | 2004-307918 A | 11/2004 |
| JP | 2006-176844 A | 7/2006 |
| JP | 4235077 B2 | 3/2009 |
| JP | 2010-222638 A | 10/2010 |
| JP | 2010-236012 A | 10/2010 |
| JP | 5094888 B2 | 12/2012 |
| JP | 5297630 B2 | 9/2013 |
| JP | 2016-211076 A | 12/2016 |
| JP | 2017-172027 A | 9/2017 |
| WO | WO 2015/174078 A1 | 11/2015 |
| WO | WO 2016/017692 A1 | 2/2016 |
| WO | WO 2017/038705 A1 | 3/2017 |

OTHER PUBLICATIONS

International Search Report for PCT/JP2018/012311 dated Jun. 19, 2018.
Written Opinion of the International Searching Authority for PCT/JP2018/012311 (PCT/ISA/237) dated Jun. 19, 2018.
Chinese Office Action and Search Report, dated Nov. 4, 2020, for Chinese Application No. 201880020592.X, with English translations.
Extended European Search Report, dated Jun. 30, 2020, for European Application No. 18776128.3.
He, "Production Technology and Application of Cold Rolled Stainless Steel," Metallurgical Industry Press, Aug. 31, 2014, pp. 38-39, 41, 43-44 (total 9 pages).
Zaymovsky et al., "Special Steel," China Industry Press, Jul. 31, 1965, pp. 429-430 (total 5 pages).
Chinese Office Action and Search Report, dated Apr. 23, 2021, for Chinese Application No. 201880020592.X, with English Translation.
Induction Furnace Melting and Special Casting Technology, Chang Heming et al., pp. 125 and 126, Metallurgical Industry Press, published on Jan. 31, 2002.
Metal Plastic Processing Technology, complied by Gokyū Isao (Japanese),translated by Chen Tianzhong et al., p. 233, Metallurgical Industry Press, published on Mar. 31, 1987.
Notice of Allowance dated Jun. 16, 2021 in Korean Patent Application No. 10-2019-7027403, with English translation.
Investment Casting, Edition Group of Investment Casting, National Defense Industry Press, Published on Jan. 31, 1984, p. 57.
Rejection Decision issued in corresponding Chinese Application No. 201880020592.X dated Sep. 3, 2021, with machine translation.

* cited by examiner

| COMPONENT | No.X: 11Cr-0.05Al | No.Y: 11Cr-1.87Al | No.Z: 11Cr-4.93Al |
|---|---|---|---|
| Cr/Si+Al | 24 | 5 | 2 |
| Al + Si CONCENTRATION OF SURFACE LAYER | 12at% | 16at% | 21at% |
| PHOTOGRAPH OF EXTERNAL APPEARANCE AFTER CORROSION RESISTANCE TEST |  |  |  |
| PRESENCE OR ABSENCE OF ABNORMAL OXIDATION IN OXIDATION TEST | PRESENCE | ABSENCE | ABSENCE |

FERRITE-BASED STAINLESS STEEL SHEET HAVING LOW SPECIFIC GRAVITY AND PRODUCTION METHOD THEREFOR

TECHNICAL FIELD

The present invention relates to a ferritic stainless steel sheet (ferrite-based stainless steel sheet) having a low specific gravity and a production method therefor. In particular, the present invention relates to a ferritic stainless steel sheet having a low specific gravity which is suitable for use in exhaust system parts requiring high-temperature strength (strength at high temperatures) and oxidation resistance and which contributes to weight reduction of parts; and a production method therefor.

The present application claims priority on Japanese Patent Application No. 2017-069142 filed on Mar. 30, 2017, the content of which is incorporated herein by reference.

BACKGROUND ART

Exhaust systems in automobiles is composed of various environment-responsive parts such as an exhaust gas recirculation (EGR) cooler, an exhaust heat recovery unit, diesel particulate filter (DPF), and urea selective catalytic reduction (SCR), whose installation is increasing in recent years, together with an exhaust manifold, a catalytic converter, a flexible tube, a front pipe, a center pipe, a muffler, and the like.

These exhaust system parts allow a high-temperature exhaust gas emitted from an engine to pass through. For this reason, a material constituting the exhaust system parts is required to have various properties such as oxidation resistance, high-temperature strength, and thermal fatigue properties. In addition, among these exhaust system parts, parts exposed to inner surface condensed water corrosion and outer surface salt damage environment are required to have properties of excellent pitting resistance due to corrosion.

Among the exhaust system parts, for example, the cases (containers) of the exhaust manifold and the catalytic converter are exposed to a particularly high-temperature exhaust gas, and thus excellent stainless steel with emphasis on heat resistance is used therefor.

Meanwhile, the temperature of an exhaust gas becomes low in the center pipe, muffler, and the like which are placed in a rear part of the exhaust system, and thus stainless steel with emphasis on corrosion resistance is used therefor.

Among stainless steels, an austenitic stainless steel has excellent heat resistance and workability, but it has a large coefficient of thermal expansion; and thereby, thermal fatigue fracture is likely to be generated when it is applied to members such as an exhaust manifold which is repeatedly heated and cooled. In addition, an austenitic stainless steel may have inferior scale spallation properties as compared to a ferritic stainless steel, and because an austenitic stainless steel contains a large amount of Ni, which is expensive, there is a problem of an increase in cost.

Accordingly, a ferritic stainless steel is mainly used for exhaust system parts of automobiles in many cases.

In recent years, a highly heat-resistant and highly corrosion-resistant ferritic stainless steel sheet has been used for exhaust system parts from the viewpoint of strengthening exhaust gas regulations, improving engine performance, reducing the weight of vehicle bodies, and the like.

In parts for which heat resistance is important, for example, SUS430J1 (Nb-added steel), Nb—Si-added steel, SUS444 (Nb—Mo-added steel), and Nb—Cu-added steel are applied (refer to Patent Document 1). All of these are based on the addition of Nb, and high-temperature strength is improved by solid solution strengthening or precipitation strengthening with Nb, and thermal fatigue life is improved.

Meanwhile, since corrosion resistance is important in the center pipe, muffler, and the like which are placed in a rear part of the exhaust system, SUH409L (Ti-added steel), SUS430LX (Ti-added steel), SUS436L (Ti—Mo-added steel), and the like are used therefor, and steels that improve outer surface salt corrosion resistance (corrosion resistance to salt damage of an outer surface) or inner surface condensed water corrosion resistance (corrosion resistance with respect to condensed water of an inner surface) by Cr and Mo are being applied thereto in many cases.

In recent years, the movement to improve fuel efficiency by a weight reduction of vehicle bodies has increased.

In contrast, environment-responsive parts (an EGR cooler, an exhaust heat recovery machine, DPF, GPF, and the like) are being installed at each part of exhaust pipes for exhaust gas purification, and thus the total weight of exhaust system parts tends to increase.

As a method for reducing a weight of a vehicle body by limiting a weight increase accompanying an increase of various parts, it is effective to reduce the thickness of a steel sheet used for various exhaust system parts, that is, a reduction of thickness is effective. In order to reduce thickness and weight, it is necessary to increase the strength and corrosion resistance of a steel that is a material in order to compensate for strength and the like of a reduced thickness. Generally, a method in which a large amount of alloying elements is added to improve high-temperature strength and corrosion resistance is adopted. However, in this case, alloy cost may be increased, and manufacturability of steel sheets may deteriorate. In addition, an element for improving corrosion resistance does not necessarily improve high-temperature strength, and no steel has been found which can achieve both of high strength and high corrosion resistance while limiting an increase in alloy cost.

As another method for reducing a weight of a vehicle body, there is a method in which the weight (the specific gravity) of a material itself used for various exhaust system parts is reduced. If this can be achieved, this achievement leads directly to a weight reduction of parts and a weight reduction of a vehicle body.

In the case of general ferritic stainless steel, its specific gravity is about 7.7 to 7.9 g/cm$^3$, but if the specific gravity can be set to be 7.6 g/cm$^3$ or less, it is possible to obtain an effect of weight reduction by 2% to 4% or more.

Patent Document 2 and Patent Document 3 disclose a technique regarding a steel sheet that has high strength and a low specific gravity and contains 10% or less of Al, although this relates to steels other than stainless steel.

Meanwhile, in any of a case in which the specific gravity of stainless steel containing 50% or more of Fe and 10% or more of Cr is reduced and a case in which a low specific gravity element (for example, Al, B, Mg, Si, Ti, and the like) is added, the manufacturability of a steel deteriorates, and there is a problem of workability of products.

Patent Document 4 discloses a heat-resistant ferritic stainless steel which is for supporting a catalyst and is excellent in weldability and workability, and the ferritic stainless steel contains 10% to 25% of Cr, 0.1% to 2% of Si, and 1% to 2.5% of Al, in which Al+0.5 Si is 1.5% to 2.8%. However, the steel component is adjusted from the viewpoint of film formation and workability, and high-temperature strength and corrosion resistance are not mentioned in Patent Document 4.

As described above, Patent Document 2 and Patent Document 3 disclose a technique utilizing Al, which is a low specific gravity element, but the amount of Cr is at most 5% or less in the steel sheets of these Patent Documents, and thus the steel sheets cannot be applied for the purpose of corrosion resistance and the purpose of heat resistance.

In addition, the steel component disclosed in Patent Document 4 is adjusted from the viewpoint of film formation and workability, and high-temperature strength and corrosion resistance are not mentioned.

PRIOR ART DOCUMENTS

Patent Documents

Patent Document 1: Japanese Patent No. 5297630
Patent Document 2: Japanese Patent No. 5094888
Patent Document 3: Japanese Patent No. 4235077
Patent Document 4: Japanese Patent No. 3474829

DISCLOSURE OF THE INVENTION

Problems to be Solved by the Invention

The present invention has been made to solve the above-mentioned problems, and an object thereof is to provide a ferritic stainless steel sheet having a low specific gravity which has excellent heat resistance (high-temperature strength), oxidation resistance, corrosion resistance, and workability which are required for exhaust parts of automobiles; and a production method therefor.

Solutions for Solving the Problems

The inventors of the present invention found that it is possible to obtain a ferritic stainless steel sheet having a low specific gravity which has excellent high-temperature strength, oxidation resistance, corrosion resistance, and workability by mainly adjusting the addition amount of Cr, Al, and Si and reducing the specific gravity of a steel in a ferritic stainless steel component; and thereby, the present invention has been completed.

Hereinafter, new findings obtained by the inventors of the present invention will be described.

The inventors of the present invention have added Al, which is a low specific gravity element, because there is a problem of toughness and ductility as factors other than heat resistance and corrosion resistance from the viewpoint of manufacturability of steel sheets and parts. Furthermore, the inventors of the present invention have examined amounts of Cr and Si for securing heat resistance, corrosion resistance, and toughness. As a result, the specific gravity of a ferritic stainless steel could be reduced by adding Al, which is a low specific gravity element, but toughness and ductility would be greatly deteriorated, and cracking would be generated in steel sheet production stages or pressing processing to parts. Accordingly, it has been found that balance between Al and other elements is necessary. Specifically, it is effective to reduce a value of Cr/(Si+Al) to a specific value or less.

In addition, the inventors of the present invention have succeeded in securing Al in solid solution and improving high-temperature strength and oxidation resistance by controlling the generation amount of Al nitrides (AlN).

Furthermore, the inventors of the present invention have found that concentrating of Si and concentrating of Al in a surface layer of a steel sheet greatly improved corrosion resistance after heating, and have found that corrosion resistance required for exhaust system parts is satisfied without increasing the amount of Cr or adding Mo.

That is, the present invention has been completed based on the above-described findings, and the features of one aspect of the present invention for achieving the above-mentioned object are as follows.

[1] A ferritic stainless steel sheet having a low specific gravity containing, by mass %: C: 0.001% to 0.020%; Si: 0.01% to 4.00%; Mn: 0.01% to 3.00%; P: 0.010% to 0.040%; S: 0.0001% to 0.0100%; Cr: 10.0% to 15.0%; N: 0.001% to 0.020%; Al: 0.50% to 10.0%; and either one or both of Ti: 0.05% to 0.40% and Nb: 0.05% to 0.40%, with the balance being Fe and unavoidable impurities, wherein Cr/(Si+Al) is 10.0 or less, and a specific gravity is 7.6 g/cm$^3$ or less.

[2] The ferritic stainless steel sheet having a low specific gravity according to [1], wherein a precipitation amount of AlN is 0.010% or less by mass %.

[3] The ferritic stainless steel sheet having a low specific gravity according to [1] or [2], wherein a sum of a maximum value of an Al concentration and a maximum value of a Si concentration in a region from a steel sheet surface to a depth of 5 nm is 15 at % or more.

[4] The ferritic stainless steel sheet having a low specific gravity according to any one of [1] to [3], further containing one or more of, by mass %: Cu: 0.01% to 3.00%; Ni: 0.01% to 2.00%; Mo: 0.01% to 3.00%; V: 0.01% to 0.50%; B: 0.0002% to 0.0050%; Ca: 0.0005% to 0.0100%; W: 0.1% to 3.0%; Zr: 0.01% to 0.10%; Ta: 0.01% to 0.10%; Hf: 0.01% to 0.10%; Sn: 0.005% to 0.50%; Co: 0.03% to 0.30%; Mg: 0.0002% to 0.010%; Sb: 0.005% to 0.50%; REM: 0.002% to 0.20%; and Ga: 0.0002% to 0.30%.

[5] A method for producing the ferritic stainless steel sheet having a low specific gravity according to any one of [1] to [4], the method including: a step of annealing a cold-rolled sheet; and a pickling step that is performed after the step of annealing the cold-rolled sheet, wherein in the step of annealing the cold-rolled sheet, an annealing temperature is set to be 900° C. or higher, and a cooling rate from 900° C. to 600° C. is set to be 100° C./sec or more, and in the pickling step, first, the cold-rolled sheet is immersed in a molten alkali salt at a temperature of 440° C. or lower for 5 seconds to 30 seconds, and thereafter, the cold-rolled sheet is cooled to room temperature at a cooling rate of 50° C./sec or less, and next, the cold-rolled sheet is immersed in a nitric hydrofluoric acid solution in which an amount of hydrofluoric acid is 10 to 30 g/l and an amount of nitric acid is 20 to 60 g/l at a temperature of 30° C. to 60° C. for 10 seconds to 60 seconds.

Effects of the Invention

According to one aspect of the present invention, it is possible to provide a ferritic stainless steel sheet having a low specific gravity and excellent in workability, heat resistance, and corrosion resistance in which the specific gravity of the steel sheet is reduced by adding appropriate amounts of Al and Si that have a low specific gravity.

EMBODIMENTS FOR CARRYING OUT THE INVENTION

Hereinafter, one embodiment of a ferritic stainless steel sheet having a low specific gravity (hereinafter, will also be simply referred to as the steel sheet) of the present invention will be described. The specific gravity of the steel sheet of the present embodiment is 7.6 g/cm$^3$ or less.

First, the reason for limiting a composition of the steel sheet according to the present embodiment will be described. The symbol "%" showing the component of steel means by mass % unless there is particular notice.

C is a low specific gravity element, but it degrades formability and corrosion resistance and causes a decrease in high-temperature strength; and therefore, it is better that the amount thereof decreases. For this reason, the amount of C is set to be 0.020% or less. The amount of C is preferably set to be 0.009% or less. However, an excessive reduction leads to an increase in a refining cost; and therefore, the amount of C is set to be 0.001% or more, and is preferably set to be 0.003% or more.

As is the case with C, N is a low specific gravity element, but it degrades formability and corrosion resistance and causes a decrease in high-temperature strength; and therefore, it is better that the amount thereof decreases. For this reason, the amount of N is set to be 0.020% or less. The amount of N is preferably set to be 0.015% or less. However, an excessive reduction leads to an increase in a refining cost, and therefore the amount of N is set to be 0.001% or more, and is preferably set to be 0.003% or more.

Si has a specific gravity of 2.3 g/cm$^3$ and is a light element as compared to the specific gravity of Fe (7.9 g/cm$^3$). For this reason, Si is an important element in the present embodiment. In addition, Si is a useful element as a deoxidizing agent, and is also an element that improves high-temperature strength. Furthermore, Si forms a Si oxide in a surface layer of a steel sheet at the time of heating; and thereby, Si improves not only oxidation resistance but also corrosion resistance. Therefore, 0.01% or more of Si is contained. In consideration of oxidation resistance and high-temperature strength, the amount of Si is preferably 0.20% or more, and in consideration of thermal fatigue properties and outer surface corrosion resistance, the amount of Si is more preferably 0.40% or more. On the other hand, in the case where the amount of Si exceeds 4.00%, toughness greatly deteriorates, and there are problems of sheet breakage at the time of producing a steel sheet and brittle cracking at the time of processing a part; and therefore, the upper limit of the amount of Si is set to be 4.00% or less. In consideration of manufacturability, the amount of Si is preferably 3.00% or less.

Mn is an element added as a deoxidizing agent and contributes to an increase in high-temperature strength in a medium temperature range. In addition, a Mn-based oxide is formed in the surface layer of the steel sheet during long-term use, and it contributes to scale adhesion and an effect of limiting abnormal oxidation; and therefore, 0.01% or more of Mn is contained. In consideration of scale adhesion, the amount of Mn is preferably 0.05% or more, and is more preferably 0.10% or more. On the other hand, in the case where the amount of Mn exceeds 3.00%, ductility at room temperature is lowered, and in addition, MnS is formed; and thereby, corrosion resistance deteriorates. For this reason, the upper limit of the amount of Mn is set to be 3.00% or less. Furthermore, in consideration of high-temperature ductility, the amount of Mn is preferably 1.50% or less.

P is a solid solution strengthening element and hardens materials; and therefore, it is better that the amount thereof decreases from the viewpoint of ductility and toughness. For this reason, the upper limit of the amount of P is set to be 0.040%. The amount of P is preferably 0.030% or less in consideration of corrosion resistance. In addition, an excessive reduction of the amount of P leads to an increase in raw material cost, and thus the lower limit of the amount of P is set to be 0.010% or more. Furthermore, in consideration of manufacturing cost, the amount of P is preferably 0.015% or more.

Because S is an element that degrades corrosion resistance and oxidation resistance, it is better that the amount thereof decreases. However, an excessive reduction of the amount of S causes an increase in refining cost, and thus the amount of S is set to be 0.0001% or more, and is preferably set to be 0.0005% or more. On the other hand, in the case where the amount of S exceeds 0.0100%, ductility and toughness deteriorate due to the formation of precipitates such as MnS, $Ti_4C_2S_2$, and the like, and thus the upper limit of the amount of S is set to be 0.0100% or less. In consideration of the limitation of crevice corrosion at the time of applying the steel sheet to a fuel component, the amount of S is preferably 0.0030% or less.

Cr is an essential element for securing oxidation resistance and corrosion resistance in the present embodiment. In the case where the amount of Cr is less than 10.0%, the effect thereof is not exhibited, and thus the lower limit of the amount of Cr is set to be 10.0% or more. On the other hand, Cr is an element that degrades toughness and workability as is the case with Al and Si utilized in the present embodiment; and therefore, in the case of combined addition of Al and Si, it becomes difficult to add a large amount of Cr. Therefore, in order to secure toughness at the time of producing a steel sheet, it is necessary to set the amount of Cr to be 15.0% or less. Furthermore, in consideration of manufacturability and high-temperature ductility, the amount of Cr is preferably 14.5% or less, and is more preferably less than 14.0%.

Al has a specific gravity of 2.7 g/cm$^3$ and is a light element as compared to the specific gravity of Fe (7.9 g/cm$^3$). For this reason, it is an important element in the present embodiment. In addition, Al is a useful element as a deoxidizing agent, and is also an element improving high-temperature strength and oxidation resistance; and therefore, 0.50% or more of Al is contained. In consideration of high-temperature strength and oxidation resistance, the amount of Al is preferably 0.60% or more. On the other hand, Al is an element which embrittles steel, and in the case where more than 10.0% of Al is added, it causes problems of sheet breakage at the time of producing a steel sheet and cracking at the time of processing a part, and thus the upper limit of the amount of Al is 10.0% or less. In consideration of weldability, the amount of Al is preferably 4.00% or less, and is more preferably 2.50% or less. Furthermore, in consideration of surface defects and pickling properties during steel sheet production, the amount of Al is preferably 1.50% or less.

Ti and Nb are elements which combine with C and N to improve corrosion resistance, intergranular corrosion resistance, ductility at room temperature, and deep drawability, and are added singly or in combination. That is, either one or both of Ti and Nb are added. Since these effects are exhibited in the case where the amount of each of Ti and Nb is 0.05% or more, the lower limit of each amount of Ti and Nb is set to be 0.05% or more. On the other hand, Ti is a low specific gravity element, but causes generation of surface defects and a decrease in toughness, and thus the upper limit of the amount of Ti is 0.40% or less. However, in consideration of weldability and workability, the amount of Ti is preferably 0.25% or less. Since Nb is a high specific gravity element, it is preferable that the amount thereof is small, but it is an element that improves high-temperature strength, and thus the amount of Nb can be set to be 0.40% or less. In consideration of weldability, the amount of Nb is preferably 0.30% or less, and is more preferably 0.25% or less. Furthermore, in consideration of alloy cost, the amount of Nb is preferably 0.15% or less.

The basic composition of the steel sheet of the present embodiment has been described above, but in addition to the above-described components, it is preferable to selectively contain one or more of the elements shown below.

Cu is an element effective to improve high-temperature strength in a middle-temperature range of about 600° C. to 800° C. and is an element improving rust resistance; and therefore, Cu is contained in an amount of 0.01% or more if needed. On the other hand, in the case where an excessive amount of Cu is contained, it causes problems in ductility at room temperature and oxidation resistance. In addition, Cu has a specific gravity of 9.0 g/cm$^3$ and is a heavy element as compared to the specific gravity of Fe (7.9 g/cm$^3$). Furthermore, in the case where Cu is contained in an amount of more than 3.00%, edge cracking in a hot rolling process becomes remarkable, and it causes a problem in manufacturability, and thus the upper limit of the amount of Cu is set to be 3.00% or less. In consideration of manufacturability, scale adhesion, and weldability, the amount of Cu is preferably 0.01 to 1.50%.

Ni improves initial rust resistance by limiting crevice corrosion and promoting repassivation; and therefore, Ni is contained in an amount of 0.01% or more if needed. However, in the case where Ni is contained in an excessive amount, it hardens and degrades formability. In addition, Ni has a specific gravity of 8.9 g/cm$^3$ and is a heavy element as compared to the specific gravity of Fe (7.9 g/cm$^3$). Therefore, the upper limit of the amount of Ni is set to be 2.00% or less. The amount of Ni is preferably 0.01 to 0.50% in consideration of the raw material cost.

Mo is an element that improves corrosion resistance and high-temperature strength, and is an element necessary to limit crevice corrosion particularly when a steel sheet is applied to a member having a crevice structure. Therefore, 0.01% or more of Mo is contained if needed. On the other hand, Mo has a specific gravity of 10.2 g/cm$^3$ and is a heavy element as compared to the specific gravity of Fe (7.9 g/cm$^3$), and in addition, Mo is an element that degrades toughness, and thus the upper limit of the amount of Mo is set to be 3.00% or less. Furthermore, in consideration of the manufacturing cost, the amount of Mo is preferably 0.01% to 1.90%.

V limits crevice corrosion and contributes to the improvement of toughness by adding a small amount of V, and thus 0.01% or more of V is contained if needed. However, in the case where V is contained in an excessive amount, it hardens and degrades formability. Furthermore, coarse V (C, N) precipitates and this leads to deterioration in toughness. Therefore, the upper limit of the amount of V is set to be 0.50% or less. The amount of V is preferably 0.01 to 0.20% in consideration of the raw material cost and the initial rusting property.

B is an element which improves secondary processing properties at the time of press processing of a product by segregating at grain boundaries to strengthen grain boundaries, and 0.0002% or more of B is contained if needed. However, in the case where B is contained in an excessive amount, the hardening occurs, and intergranular corrosion resistance and oxidation resistance deteriorate, and weld cracking occurs, and thus the amount of B is set to be 0.0050% or less. Furthermore, in consideration of corrosion resistance and manufacturing cost, the amount of B is preferably 0.0002% to 0.0015%.

Ca may be contained for desulfurization, and this effect is exhibited in the case where the amount thereof is 0.0005% or more; and therefore, the lower limit of the amount of Ca is set to be 0.0005% or more. However, in the case where more than 0.0100% of Ca is contained, coarse CaS is generated to deteriorate toughness and corrosion resistance, and thus the upper limit of the amount of Ca is set to be 0.0100% or less. Furthermore, in consideration of refining costs and manufacturability, the amount of Ca is preferably 0.0005% to 0.0020%.

Since W contributes to the improvement of corrosion resistance and high-temperature strength, 0.1% or more of W is contained if needed. However, W has a specific gravity of 19.3 g/cm$^3$ and is a heavy element as compared to the specific gravity of Fe (7.9 g/cm$^3$). In addition, in the case where W is contained in an excessive amount, it leads to deterioration of toughness and cost increase at the time of producing a steel sheet, and thus, the upper limit of the amount of W is set to be 3.0% or less. Furthermore, in consideration of the refining cost and manufacturability, the amount of W is preferably 0.1 to 1.0%.

Zr, Ta, and Hf are combined with C and N to contribute to the improvement of toughness; and therefore, Zr, Ta, and Hf are each contained in an amount of 0.01% or more if needed. However, in the case where Zr, Ta, and Hf are contained in an amount of more than 0.10%, the cost increases and the manufacturability greatly deteriorates, and thus the upper limit of the amount of each of Zr, Ta, and Hf is set to be 0.10% or less. In addition, in consideration of refining costs and manufacturability, the amount of each of Zr, Ta, and Hf is preferably 0.01% to 0.08%.

Since Sn and Sb contribute to the improvement of corrosion resistance and high-temperature strength, Sn and Sb are each contained in an amount of 0.005% or more if needed. However, in the case where Sn and Sb are contained in an amount of more than 0.50%, slab cracking may occur during production of the steel sheet, and thus the upper limit of the amount of each of Sn and Sb is set to be 0.50% or less. Furthermore, in consideration of refining costs and manufacturability, the amount of each of Sn and Sb is preferably 0.005 to 0.20%.

Co contributes to the improvement of high-temperature strength, and thus 0.03% or more of Co is contained if needed. However, since Co has a specific gravity of 8.9 g/cm$^3$ and is a heavy element as compared to the specific gravity of Fe (7.9 g/cm$^3$), the upper limit of the amount of Co is set to be 0.30% or less. Furthermore, in consideration of refining cost and manufacturability, the amount of Co is preferably 0.03 to 0.10%.

Mg may be contained as a deoxidizing element. In addition, Mg is an element which refines the structure of a slab and contributes to the improvement of formability. Furthermore, Mg oxide becomes a precipitation site of carbonitrides such as Ti(C, N), Nb(C, N), and the like and has effects of finely dispersing and precipitating these carbonitrides. These effects are exhibited in the case where the amount of Mg is 0.0002% or more, and these effects contribute to the improvement of toughness; and therefore, the lower limit of the amount of Mg is set to be 0.0002% or more. However, in the case where Mg is contained in an excessive amount, it leads to deterioration of weldability and corrosion resistance, and thus, the upper limit of the amount of Mg is set to be 0.010% or less. In consideration of the refining cost, the amount of Mg is preferably 0.0002 to 0.0010%.

REM may be contained if needed from the viewpoint of improvement of toughness and oxidation resistance by refinement of various precipitates. Since this effect is exhibited in the case where the amount thereof is 0.002% or more, the lower limit of the amount of REM is set to be 0.002% or more. However, in the case where REM is contained in an amount of more than 0.20%, the castability deteriorates greatly, and thus the upper limit of the amount of REM is set to be 0.20% or less. Furthermore, in consideration of the refining cost and manufacturability, the amount of REM is preferably 0.002 to 0.01%.

REM (rare earth element) refers to a generic term of 2 elements of scandium (Sc) and yttrium (Y) and 15 elements (lanthanoids) from lanthanum (La) to lutetium (Lu) according to a general definition. It may be added alone or as a mixture. The above-described amount of REM is a total amount of these rare earth elements.

0.30% or less of Ga may be contained in order to improve corrosion resistance and limit hydrogen embrittlement. From the viewpoint of the formation of sulfide and hydride, the lower limit of the amount of Ga is set to be 0.0002% or more. Furthermore, from the viewpoint of manufacturability and cost, the amount of Ga is preferably 0.0020% or less.

The steel sheet of the present embodiment consists of Fe and unavoidable impurities other than the above-described elements, but can contain elements in addition to the above-described elements as long as the effects of the present embodiment are not impaired. For example, in the present embodiment, Bi or the like may be contained in an amount of 0.001 to 0.1% if needed. In addition, it is preferable to reduce general harmful elements and impurity elements such as As, Pb, and the like as much as possible.

Furthermore, regarding the above-described composition, a value of Cr/(Si+Al) is defined to be 10.0 or less in the present embodiment. Cr, Si, and Al in the formula are amounts (by mass %) of the respective elements.

From the viewpoint of corrosion resistance and oxidation resistance, it is preferable that the amount of Cr is large. However, Cr is an element which lowers toughness as is the case with Al and Si; and therefore, it is difficult to contain a large amount of Cr. Furthermore, in the present embodiment, since large amounts of Si and Al are contained to lower the specific gravity, in the case where the amount of Cr is large, toughness at the time of steel production and toughness of the product sheet become an issue. In other words, the specific gravity of the ferritic stainless steel can be reduced by utilizing Al and Si, which are low specific gravity elements; however, in the case where the amount of Cr is large, toughness and ductility greatly deteriorate, and cracking is generated in the stage of producing a steel sheet and the step of press working the steel sheet into parts. Therefore, the balance of the amounts of Cr, Si, and Al is important.

Furthermore, as will be described later, in the present embodiment, even with a relatively low Cr component (composition including a relatively small amount of Cr), it is possible to ensure oxidation resistance and corrosion resistance by utilizing the fact that Si and Al is concentrated in the oxide film layer on the surface of the product sheet. For this reason, the amounts of Cr, Si, and Al are controlled in the above-described ranges. Preferably, Cr/(Si+Al) is set to be 9.0 or less. The lower limit of Cr/(Si+Al) is not particularly limited, but is preferably 1.0 or more from the viewpoint of manufacturability.

Next, a precipitation amount of AlN will be described.

As described above, the steel sheet in the present embodiment is characterized in that it contains Al having a low specific gravity.

Al is an element that improves high-temperature strength, but when examined in detail, it was found that precipitates of Al affect high-temperature strength. That is, Al inhibits the migration of dislocations in a high-temperature environment by solid solution strengthening; and thereby, Al contributes to high strength. However, on the other hand, it has been found that Al is easily combined with nitrogen to form AlN, and when this AlN is formed, the amount of Al in solid solution is reduced and the high-temperature strength is not effectively improved. Therefore, it is necessary to limit the precipitation of AlN at the stage of the product sheet, and for this purpose, it is effective to utilize elements such as Ti and Nb. This is because these elements are more likely to become nitrides than Al.

In the present embodiment, a precipitation amount of AlN is 0.010% or less by mass %, and is preferably 0.008% or less.

Hereinafter, the reasons for limiting the precipitation amount of AlN will be described.

Figure 1:
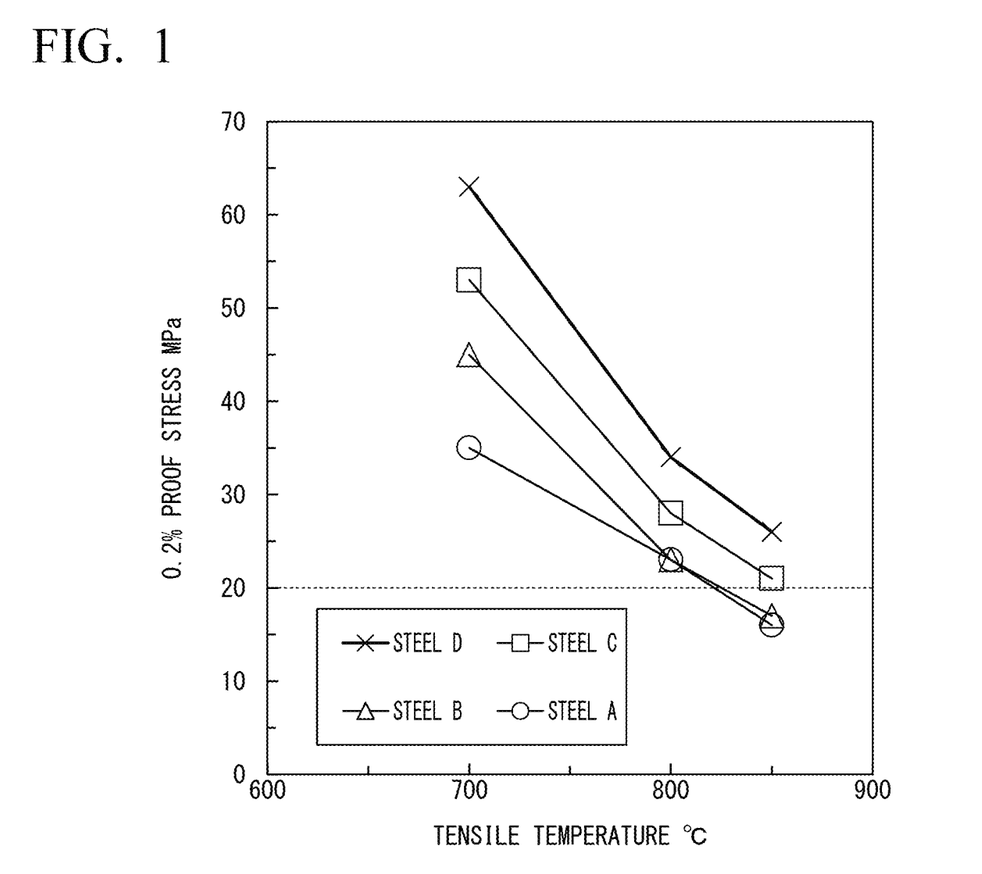
FIG. 1 is a graph showing 0.2% proof stress of a steel sheet according to the present embodiment and a steel sheet of the related art in a high-temperature tensile test.

FIG. 1 shows the results of a high-temperature tensile test of a cold-rolled steel sheet (a sheet thickness of 1.2 mm). The steel A is SUH 409L (11% Cr-0.2% Ti-0.01% Al-0.005% C-0.01% N) which is widely used. On the other hand, the composition of the steel B and the steel C is 11% Cr-0.2% Ti-0.5% Al-0.005% C-0.01% N, and the composition of the steel D is 11% Cr-0.2% Ti-4.9% Al-0.005% C-0.01% N.

In addition, the steel B and the steel C have the same composition, but a precipitation amount of AlN is different depending on producing conditions to be described later. Specifically, precipitation amounts of AlN for the steel B and the steel C are 0.150% and 0.005%, respectively. Furthermore, a precipitation amount of AlN for the steel D is 0.010%.

As can be seen from FIG. 1, it can be understood that high-temperature strength is improved by the addition of Al, and 0.2% proof stress of the steel D having the largest amount of Al was the highest. On the other hand, the steel B and the steel C have the same component and different precipitation amounts of AlN, and with regard to the steel B having a large precipitation amount of AlN, the high-temperature strength was low, and the 0.2% proof stress at 850° C. was as low as that of the already-existing SUH409L. That is, by setting the precipitation amount of AlN to be 0.01% or less, the high-temperature strength was further improved, and the 0.2% proof stress at 850° C. or less became 20 MPa or more.

In the case where 20 MPa or more of the 0.2% proof stress is secured at a temperature of 850° C. or less, the strength is higher than that of SUH 409L, which is a typical heat resistant ferrite steel shown as a comparison. A steel sheet having such a 0.2% proof stress can be applied to the exhaust parts of the current automobile, and also exhibits characteristics capable of coping with the increase in exhaust gas temperature.

The precipitation amount of AlN refers to the amount of N precipitated as AlN by extraction residue analysis. In the extraction residue analysis, an appropriate test specimen was collected from the entire thickness of the steel sheet, and the precipitates in the steel were extracted using a tetramethyl ammonium chloride solution and a filter having a pore size of 0.2 μm, and the analysis was performed by Inductively Coupled Plasma (ICP).

The high-temperature tensile test was conducted in parallel to a rolling direction of the steel sheet in accordance with JIS G0567.

Next, an Al concentration+a Si concentration in a region from a steel sheet surface to a depth of 5 nm will be described.

In general, a Cr-enriched passivation film is formed on the surface of stainless steel, and this film contributes to the improvement of oxidation resistance and corrosion resistance. However, in the present embodiment, as described above, large amounts of Si and Al are contained so as to reduce the specific gravity. For this reason, it is necessary to control the amount of Cr, which can lower the toughness as is the case with Si and Al, and there is a concern that the corrosion resistance and the oxidation resistance may be reduced.

Therefore, the inventors of the present invention have examined the influence of a concentration of each element in a region from a steel sheet surface to a depth of 5 nm (hereinafter, also simply referred to as the "surface layer of the steel sheet") on oxidation resistance and corrosion resistance. As a result, it has been found that the oxidation resistance and the corrosion resistance of the steel sheet are influenced by the concentrating of Al and Si in the surface layer (an oxide film layer) of the steel sheet. That is, it has been found that Al and Si, which are concentrated in a small amount as oxides, contribute to the oxidation resistance and the corrosion resistance. In addition, according to various experiments, it has been found that, by setting a sum of the maximum value of an Al concentration and the maximum value of a Si concentration in a region from the surface to a depth of 5 nm to be 15 at % or more, the corrosion resistance and the oxidation resistance are improved even in a low Cr steel including an amount of Cr of about 10% to 15% which is the steel sheet according to the present embodiment.

In the following detailed description, a "sum of the maximum value of an Al concentration and the maximum value of a Si concentration in a region from the surface to a depth of 5 nm" will be referred to as the "Al concentration+Si concentration of the surface layer of the steel sheet."

Figure 2:
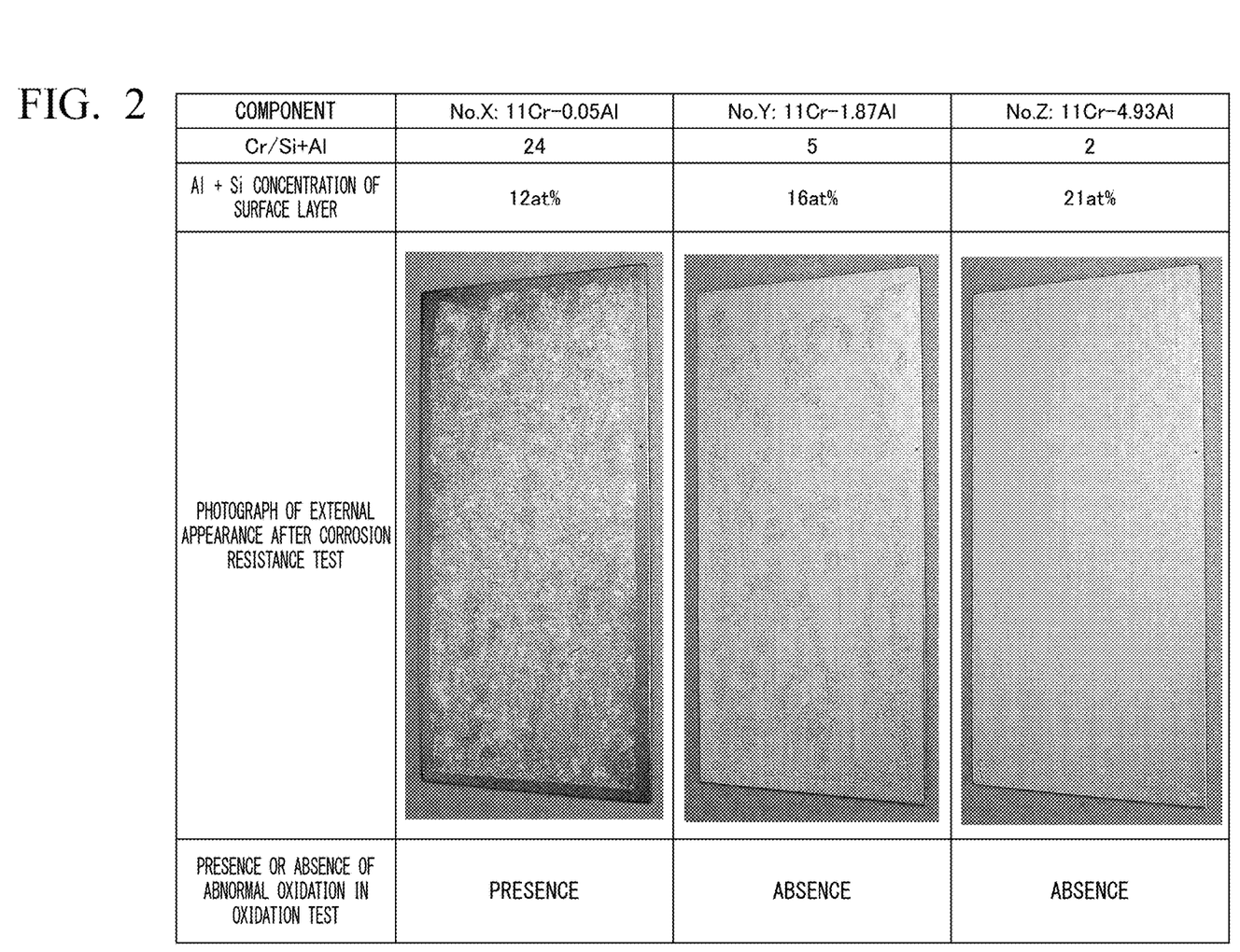
FIG. 2 is a view showing corrosion resistance and oxidation resistance of the steel sheet according to the present embodiment and the steel sheet of the related art.

FIG. 2 shows the results of examining the corrosion resistance and the oxidation resistance of three types of steel sheets having different amounts of Al. In addition, FIG. 2 also shows the results of examining amounts of Cr and Al in the steel, a value of Cr/(Si+Al), and the Al concentration+Si concentration of the surface layer of these steel sheets.

A continuous oxidation test was conducted at 850° C. for 200 hours, and then evaluation of the oxidation resistance was performed by examining the presence or absence of abnormal oxidation. In addition, the steel sheet was heat-treated at 400° C. for 8 hours or less, and then the JASO-CCT test was performed for 30 cycles. Then, evaluation of the corrosion resistance was performed by photographs of the external appearance after performing a rust removal process.

As can also be seen from FIG. 2, in the case of SUH 409L (No. X) which is a typical heat-resistant steel, the Al concentration+Si concentration of the surface layer of the steel sheet was low, abnormal oxidation occurred at 850° C., and a significant reduction in sheet thickness occurred. Furthermore, as apparent from the appearance photograph of SUH 409L, the corrosion resistance greatly deteriorated.

On the other hand, in the steel sheet (No. Y and No. Z) according to the present embodiment, the Al concentration+Si concentration in the surface layer of the steel sheet was high, the oxidation was normal, and the oxidation resistance was improved. Furthermore, as apparent from the external appearance photograph, even in the case where Cr/(Si+Al) is low, a deterioration in the corrosion resistance can be avoided when the Al concentration+Si concentration is 15 at % or more. Accordingly, in the case where Cr/(Si+Al) is low and the maximum value of Al concentration+Si concentration in a region from a steel sheet surface to a depth of 5 nm is 15 at % or more, the corrosion resistance and the oxidation resistance can be improved.

Based on the above-described results, in the present embodiment, it is preferable to control such that the sum of the maximum value of the Al concentration and the maximum value of the Si concentration in the region from a steel sheet surface to a depth of 5 nm is 15 at % or more. It is more preferable that the sum of the maximum value of the Al concentration and the maximum value of the Si concentration is 16 at % or more from the viewpoint of the balance between the low specific gravity, the oxidation resistance, and the corrosion resistance.

Thereby, even in the case of a relatively low Cr steel which is the steel sheet of the present embodiment, it is possible to secure oxidation resistance and corrosion resistance by utilizing the concentrating of Si and Al in the surface layer of the steel sheet. The upper limit of the sum of the maximum value of the Al concentration and the maximum value of the Si concentration is not particularly limited, but is preferably 25 at % or less from the viewpoint of manufacturability.

The elemental analysis of the surface layer of the steel sheet was performed using Electron Spectroscopy for Chemical Analysis (ESCA). First, surface analysis was performed in a depth direction from the surface of the steel sheet, and the concentration of each element was determined by cation fraction excluding oxygen, and the sum of the maximum Al concentration and the maximum Si concentration in a region from the steel sheet surface to a depth of 5 nm was obtained.

The mechanism by which Al and Si concentrated as oxides in the surface layer of the steel sheet contribute to the improvement of the oxidation resistance and the corrosion resistance is not clear, but it is considered as follows.

In a steel including a relatively low amount of Cr which is the steel sheet of the present embodiment, oxidation of Fe is promoted, and Fe-rich oxide scale is easily generated during heating; and therefore, abnormal oxidation is likely to be caused and corrosion resistance is poor. However, the formation of oxides of Si and Al in the surface layer of the steel sheet is considered to limit the oxidation of Fe and to improve the oxidation resistance and the corrosion resistance.

As described above, in the present embodiment, in order to obtain excellent corrosion resistance and oxidation resistance, the sum of the maximum value of an Al concentration and the maximum value of a Si concentration in a region from a steel sheet surface to a depth of 5 nm is preferably 15 at % or more, and in order to achieve this, the pickling method after annealing of the cold-rolled sheet is defined. In addition, in order to limit the precipitation amount of AlN, it is important to specify the annealing method of a cold-rolled sheet.

Hereinafter, a production method of the ferritic stainless steel sheet having a low specific gravity of the present embodiment will be explained.

A method for producing the steel sheet of the present embodiment includes steps of steel producing-hot rolling-annealing and pickling of hot-rolled sheet-cold rolling-annealing and pickling of cold-rolled sheet, and production conditions of each step are not particularly limited except for the steps of annealing and pickling a cold-rolled sheet. In other words, there is no particular limitation regarding the steps other than the steps of annealing and pickling a cold-rolled sheet, and well-known methods of the related art can be applied. In addition, typical production conditions are as follows.

In the steel production, it is preferable to use a method in which a steel containing the above-described composition is melted by a converter and subsequently subjected to secondary refining. The molten steel is made into a slab by a known casting method (continuous casting).

The slab is heated to a predetermined temperature and hot-rolled by continuous rolling to obtain a predetermined thickness.

After hot rolling, annealing and pickling of the hot-rolled sheet are performed, but the step of annealing the hot-rolled sheet may be omitted.

After pickling, cold rolling may be carried out using any of a general Sendzimir mill or tandem mill, but in consideration of the deep drawability of the steel sheet, the tandem mill rolling is preferable. In cold rolling, conditions such as roll roughness, roll diameter, rolling oil, the number of rolling passes, rolling speed, rolling temperature, and the like are appropriately selected and set so that each configuration and each condition of the steel sheet of the present embodiment are satisfied.

A cold-rolled sheet is annealed (final annealing) after cold rolling, but intermediate annealing may be carried out in the middle of cold rolling. The intermediate annealing and the final annealing may be batch annealing or continuous annealing. In addition, each annealing may be bright annealing performed in a non-oxidizing atmosphere such as hydrogen gas or nitrogen gas if necessary, or annealing in the air may be performed.

Furthermore, the steel sheet according to the present embodiment may be subjected to lubrication application to further improve press formability, and the type of lubricating films in this case may be appropriately selected. Furthermore, although temper rolling or leveling may be applied for shape correction after the final annealing, it is preferable not to conduct these steps because these steps lead to a decrease in work hardenability.

In the present embodiment, in the step of annealing the cold-rolled sheet, an annealing temperature is set to be 900° C. or higher, and a cooling rate from 900° C. to 600° C. is set to be 100° C./sec or more. In addition, in the pickling step after the step of annealing a cold-rolled sheet, first, the cold-rolled sheet is immersed in a molten alkali salt at a temperature of 440° C. or lower for 5 seconds to 30 seconds, and thereafter, the cold-rolled sheet is cooled to room temperature (normal temperature) at a cooling rate of 50° C./sec or less. Next, the cold-rolled sheet is immersed in a nitric hydrofluoric acid solution in which the amount (concentration) of hydrofluoric acid is 10 to 30 g/l, and the amount (concentration) of nitric acid is 20 to 60 g/l at a temperature of 30° C. to 60° C. for 10 seconds to 60 seconds.

In the present embodiment, it is preferable to limit the precipitation amount of AlN in order to effectively develop high-temperature strength. In order to limit precipitation of AlN as described above, in the present embodiment, an annealing temperature in the step of annealing the cold-rolled sheet is set to be 900° C. or higher, and a cooling rate from 900° C. to 600° C. is specified as 100° C./sec or more.

In the case where an annealing temperature is less than 900° C., precipitation of AlN occurs during heating, and high-temperature strength is not effectively improved, and thus the lower limit of the annealing temperature is set to be 900° C. or higher. Although the upper limit of the annealing temperature may be selected depending on the steel composition, the annealing temperature is preferably 1100° C. or less because excessive grain growth leads to a decrease in toughness.

With regard to a cooling rate, cooling is performed at high speed by setting the cooling rate from 900° C. to 600° C. to be 100° C./sec or more in order to limit the precipitation of AlN in the cooling step. In the case where a temperature section (range) of this high-speed cooling is less than 600° C., precipitation of AlN does not occur at a line speed of general continuous annealing, and thus the cooling rate is specified in this temperature range. A cooling method may be selected from various methods such as water cooling, air blowing, and the like so that the cooling rate is satisfied. In addition, it is preferable that the cooling rate is 300° C./sec or less from the viewpoint of manufacturability and sheet shape.

Next, the pickling step is performed, and the results of the studies for limiting the conditions of the pickling step will be described.

As described above, annealing of the cold-rolled sheet is performed at a temperature of 900° C. or higher, and at this time, a scale mainly including Fe and Cr is generated in the surface layer of the steel sheet. In addition, Si and Al are generated as an internal oxide layer at or in the vicinity of the interface between the scale and the base material.

Generally, from the viewpoint of corrosion resistance, the scale at the time of annealing needs to be completely removed. Specifically, a Cr oxide is removed by electrolytic treatment with neutral salt or immersion in a molten alkali salt at a high temperature. Thereafter, immersion in a nitric hydrofluoric acid solution is performed, and in some cases, electrolytic treatment with nitric acid is also added; and thereby, a Fe oxide is removed. As a result, a product sheet is obtained. Furthermore, in the case of steel containing Si and Al, in order to completely remove the internal oxide layer, molten salt treatment is performed at a relatively high temperature, and furthermore, descaling is performed by a high concentration nitric hydrofluoric acid treatment.

In the present embodiment, as described above, it has been found that Al and Si are concentrated as an oxide in the surface layer of the steel sheet, and the internal oxide layer of Al and Si remains, and this internal oxide layer effectively contributes to corrosion resistance and oxidation resistance. Therefore, in the pickling step, it is necessary to prevent the Si oxide and the Al oxide from being completely dissolved. In other words, pickling conditions are set such that the internal oxide layer generated in the annealing step is not completely removed. Thereby, the Al concentration+Si concentration of the surface layer of the steel sheet can be set to fall within the above-described range, and excellent corrosion resistance and oxidation resistance can be exhibited even in a low Cr steel which is a steel of the present embodiment.

Specifically, the cold-rolled sheet is immersed in the molten alkali salt at a low temperature of 440° C. or lower for 5 seconds to 30 seconds so that the oxides of Si and Al are not completely dissolved by immersion in the molten alkali salt. The reason for performing such high-speed treatment is to selectively dissolve the Cr oxide in the outer layer and to prevent the dissolution of the Si oxide and the Al oxide in the internal oxide layer. However, in the case where the treatment is performed too fast, an excessive amount of scale remains, and this leads to a deterioration in corrosion resistance. Therefore, it is preferable to immerse the cold-rolled sheet at a temperature of 400° C. or higher for 10 seconds or longer in the immersion step in the molten alkali salt. In addition, in consideration of manufacturability, the immersion time is preferably 20 seconds or shorter.

Next, after the immersion treatment in the molten alkali salt, the immersion treatment in a nitric hydrofluoric acid solution is performed to remove the Fe-based scale, and this treatment is performed at high speed as is the case with the immersion in the molten alkali salt to prevent the dissolution of the internal oxide layer of Al and Si. Specifically, the amount (concentration) of hydrofluoric acid is set to be 30 g/l or less, the amount (concentration) of nitric acid is set to be 60 g/or less, a temperature is set to be 60° C. or lower, and an immersion time is set to be 60 seconds or shorter. On the other hand, in the case where the concentration and temperature of the nitric hydrofluoric acid solution and the immersion time are excessively low, an excessive amount of scale residues are generated, and thus corrosion resistance deteriorates. For this reason, the amount (concentration) of hydrofluoric acid is set to be 10 g/l or more, the amount (concentration) of nitric acid is set to be 20 g/l or more, a temperature is set to be 30° C. or higher, and the immersion time is set to be 10 seconds or longer. Furthermore, in consideration of manufacturability and production cost, the cold-rolled sheet is preferably immersed in a mixed acid (a nitric hydrofluoric acid solution) in which the amount (concentration) of hydrofluoric acid is 10 to 20 g/l, and the amount (concentration) of nitric acid is 20 to 50 g/l at a temperature of 30° C. to 50° C. for 10 seconds to 30 seconds.

In addition, in the present embodiment, the steel sheet is once cooled to room temperature between the immersion treatment in the molten alkali salt and the immersion treatment in to the nitric hydrofluoric acid solution, and at this time, a cooling rate after the immersion treatment in the molten alkali salt is defined to be 50° C./second or less. This is because oxidation is prevented in the cooling step from the point of the completion of the immersion treatment in the molten alkali salt at a temperature of 440° C. or lower to the room temperature. In this cooling step, an oxidation reaction of Fe mainly occurs, and besides that, an internal oxidation of Si and Al also proceeds. In the case where a cooling rate after the immersion treatment in the molten alkali salt is more than 50° C./sec, oxidation of Si and Al does not proceed, and thus the internal oxide layer of Al and Si in the product sheet is difficult to remain. On the other hand, in the case where a cooling rate after the immersion treatment in the molten alkali salt is excessively slow, the oxidation of Fe also remarkably progresses, and the descaling in the immersion treatment in the nitric hydrofluoric acid solution which is the subsequent step becomes difficult. Accordingly, it is preferable to set the lower limit of the cooling rate after the immersion treatment in the molten alkali salt to be 10° C./second or more. In addition, in consideration of manufacturability and sheet shape, the cooling rate is preferably 20 to 40° C./second.

Furthermore, a cooling method after molten alkali salt treatment is not specified, and any one of gas cooling and water cooling may be adopted.

The ferritic stainless steel sheet having a low specific gravity of the present embodiment can be obtained by the production method described above.

EXAMPLES

Examples of the present invention will be described below, the conditions in the examples are examples of one condition adopted to confirm the practicability and effects of the present invention, and the present invention is not limited to the conditions used in the following examples. The present invention can adopt various conditions as long as the present invention does not deviate from the features of the present invention and the object of the present invention is achieved.

In addition, underlines in tables indicate that the values are out of the ranges of the present embodiment.

Steels having compositions shown in Tables 1 to 3 were melted and cast into slabs, and the slabs were hot-rolled to obtain hot-rolled coils having a thickness of 4 mm. Thereafter, the hot-rolled coils were pickled and cold-rolled until a thickness became 1.2 mm. The cold-rolled sheets were annealed at a temperature of 900° C. to 1000° C. where a structure thereof became a recrystallized structure. Next, the sheets were pickled; and thereby, product sheets were obtained.

Regarding production conditions of samples in Tables 4 to 6, pickling was carried out under conditions within the ranges of the present embodiment, and a cooling rate from 900° C. to 600° C. after annealing of the cold-rolled sheet was set to be 100° C./sec.

The obtained product sheets were subjected to measurement of specific gravity, evaluation of workability, evaluation of corrosion resistance, evaluation of oxidation resistance, and measurement of high-temperature strength.

Regarding the measurement of specific gravity, it was calculated by an electronic balance using a balance method.

Regarding the evaluation of workability, a JIS 13 B test specimen was collected in a direction parallel to a rolling direction, and total elongation was obtained in accordance with JIS Z 2241. Samples in which "total elongation at room temperature" was 25% or more were evaluated as "◯ (good)," and samples in which "total elongation at room temperature" was less than 25% were evaluated as "x (poor)."

Regarding the high-temperature strength, a JIS 13 B test specimen was collected in a direction parallel to a rolling direction, and a high-temperature tensile test was performed according to JIS G 0567 to obtain 0.2% proof stress. Samples in which "0.2% proof stress at 850° C." was more than 20 MPa were evaluated as "◯ (good)," and samples in which "0.2% proof stress at 850° C." was 20 MPa or less were evaluated as "x (poor)."

As a test of oxidation resistance, a continuous oxidation test was conducted at 850° C. for 200 hours in air, and the presence or absence of generation of abnormal oxidation and scale exfoliation were evaluated (in accordance with JIS Z 2281). Samples in which abnormal oxidation and scale exfoliation were not generated were evaluated as "◯ (good)," and samples in which abnormal oxidation and scale exfoliation were generated were evaluated as "x (poor)."

Regarding the evaluation of corrosion resistance, samples were heat-treated at 400° C. for 8 hours or less. Next, 30 cycles of JASO-CCT test were performed. After rust removal treatment, the maximum pitting corrosion depth was measured by a focal depth method using a microscope. Samples in which the maximum pitting corrosion depth was less than 200 μm were evaluated as "◯ (good)," and samples in which the maximum pitting corrosion depth was 200 μm or more were evaluated as "x (poor)."

Concentration analysis of Si and Al in the surface of the steel sheet was measured using the ESCA described above.

In addition, regarding a precipitation amount of AlN, the amount of N precipitated as AlN was measured as the precipitation amount of AlN by the extraction residue analysis in the same manner as in the method described above.

As can be clearly understood from Tables 4 to 6, in the steel sheets having the composition defined in the present embodiment, the specific gravity was lower than that of the steel sheets of the comparative example, and the oxidation resistance, the heat resistance (high-temperature strength), the corrosion resistance, and the workability were excellent.

Steel sheets were produced under various production conditions for steels (Steel Nos. A1 to A6) within the range of the present embodiment. Then, analysis of an Al concentration and a Si concentration in the surface layer of the steel sheet; and evaluation of the oxidation resistance, the high-temperature strength, the workability, and the corrosion resistance were performed by the methods described above. Tables 7 and 8 show production conditions and evaluation results of these samples.

As clearly shown in Tables 7 and 8, in the steel sheets produced under the production conditions defined in the present embodiment, the oxidation resistance, the workability, the heat resistance, the corrosion resistance, and the high-temperature strength are excellent as compared with those of the comparative example.

TABLE 1

|  | Sample No. | Steel No. | Composition (by mass %) (the balance is Fe and unavoidable impurities) | | | | | | | | | | | |
|---|---|---|---|---|---|---|---|---|---|---|---|---|---|---|
|  |  |  | C | Si | Mn | P | S | Cr | N | Al | Ti | Nb | Other elements | Cr/(Si + Al) |
| Example of present invention | 1 | A1 | 0.005 | 0.65 | 0.28 | 0.029 | 0.0008 | 11.0 | 0.016 | 0.96 | 0.16 | — |  | 6.8 |
|  | 2 | A2 | 0.005 | 0.40 | 0.29 | 0.031 | 0.0004 | 12.8 | 0.011 | 1.87 | 0.16 | — |  | 5.6 |
|  | 3 | A3 | 0.006 | 0.41 | 0.25 | 0.030 | 0.0003 | 11.0 | 0.009 | 2.95 | 0.17 | — |  | 3.3 |
|  | 4 | A4 | 0.005 | 0.41 | 0.19 | 0.032 | 0.0007 | 10.6 | 0.010 | 3.96 | 0.18 | — | B: 0.0008 | 2.4 |
|  | 5 | A5 | 0.005 | 0.38 | 0.09 | 0.021 | 0.0006 | 11.9 | 0.009 | 4.93 | 0.18 | — | Mg: 0.0036 | 2.2 |
|  | 6 | A6 | 0.005 | 0.42 | 0.55 | 0.030 | 0.0015 | 12.5 | 0.007 | 9.72 | 0.16 | — | Ca: 0.0015, Mg: 0.0054 | 1.2 |
|  | 7 | A7 | 0.005 | 0.72 | 0.05 | 0.029 | 0.0008 | 11.8 | 0.009 | 0.65 | 0.12 | — |  | 8.6 |
|  | 8 | A8 | 0.005 | 2.80 | 0.05 | 0.029 | 0.0008 | 14.2 | 0.009 | 0.52 | 0.25 | — | B: 0.0010 | 4.3 |
|  | 9 | A9 | 0.003 | 1.92 | 0.31 | 0.019 | 0.0006 | 14.1 | 0.012 | 0.52 | — | 0.38 | V: 0.12, Mg: 0.0004 | 5.8 |
|  | 10 | A10 | 0.013 | 0.89 | 0.31 | 0.019 | 0.0006 | 14.8 | 0.012 | 0.63 | 0.11 | 0.27 | Cu: 1.20, Ni: 0.30, Ca: 0.0020 | 9.7 |
|  | 11 | A11 | 0.009 | 1.50 | 0.98 | 0.023 | 0.0007 | 14.1 | 0.016 | 0.58 | 0.09 | 0.11 | Mo: 0.51, V: 0.09, B: 0.0007, Ca: 0.0015, Sn: 0.11 | 6.8 |
|  | 12 | A12 | 0.016 | 1.00 | 1.30 | 0.023 | 0.0007 | 11.6 | 0.013 | 1.80 | — | 0.39 | W: 0.61, REM: 0.01 | 4.1 |
|  | 13 | A13 | 0.007 | 0.70 | 0.09 | 0.018 | 0.0013 | 11.9 | 0.013 | 1.11 | — | 0.05 | Cu: 0.50, Zr: 0.05, Co: 0.11 | 6.6 |
|  | 14 | A14 | 0.002 | 0.41 | 0.56 | 0.011 | 0.0025 | 14.6 | 0.009 | 1.10 | 0.05 | — | Ta: 0.03, Hf: 0.05, Mg: 0.0015, Sb: 0.11 | 9.7 |
|  | 15 | A15 | 0.005 | 2.80 | 0.05 | 0.029 | 0.0008 | 14.2 | 0.009 | 0.52 | 0.21 | — | Mo: 0.21, B: 0.0010, Ga: 0.005 | 4.3 |

TABLE 2

|  | Sample No. | Steel No. | Composition (by mass %) (the balance is Fe and unavoidable impurities) | | | | | | | | | | | |
|---|---|---|---|---|---|---|---|---|---|---|---|---|---|---|
|  |  |  | C | Si | Mn | P | S | Cr | N | Al | Ti | Nb | Other elements | Cr/(Si + Al) |
| Comparative Example | 16 | B1 | 0.005 | 0.41 | 0.28 | 0.032 | 0.0006 | 10.9 | 0.009 | <u>0.05</u> | 0.15 | — |  | <u>23.7</u> |
|  | 17 | B2 | 0.012 | 0.89 | 0.88 | 0.020 | 0.0009 | 11.5 | 0.006 | <u>0.33</u> | 0.18 | — |  | <u>11.1</u> |
|  | 18 | B3 | 0.005 | 0.65 | 0.28 | 0.029 | 0.0008 | 11.0 | 0.016 | 0.96 | — | — |  | 6.8 |
|  | 19 | B4 | 0.005 | 0.40 | 0.29 | 0.031 | 0.0004 | 12.8 | 0.011 | 1.87 | — | — |  | 5.6 |
|  | 20 | B5 | 0.013 | 0.43 | 0.09 | 0.020 | 0.0012 | <u>18.1</u> | 0.010 | 2.00 | 0.25 | 0.06 |  | 7.8 |
|  | 21 | B6 | 0.003 | 0.42 | 0.43 | 0.015 | 0.0002 | 14.3 | 0.010 | 4.00 | 0.08 | <u>0.41</u> |  | 3.2 |
|  | 22 | B7 | <u>0.025</u> | 0.41 | 0.28 | 0.032 | 0.0006 | 10.5 | 0.008 | 1.50 | 0.15 | — |  | 5.5 |
|  | 23 | B8 | 0.012 | <u>4.50</u> | 0.34 | 0.040 | 0.0026 | 14.2 | 0.005 | 2.00 | — | 0.35 |  | 2.2 |
|  | 24 | B9 | 0.004 | 0.25 | <u>3.60</u> | 0.020 | 0.0015 | <u>17.5</u> | 0.012 | 1.53 | 0.22 | — |  | 9.8 |
|  | 25 | B10 | 0.003 | 0.26 | 0.12 | <u>0.053</u> | 0.0053 | 14.1 | 0.015 | 1.69 | 0.18 | — |  | 7.2 |
|  | 26 | B11 | 0.008 | 1.53 | 0.12 | 0.032 | <u>0.0163</u> | <u>16.2</u> | 0.005 | 2.20 | 0.12 | 0.25 |  | 4.3 |
|  | 27 | B12 | 0.009 | 0.29 | 0.26 | 0.010 | 0.0015 | <u>19.5</u> | 0.005 | 5.23 | 0.19 | 0.15 |  | 3.5 |
|  | 28 | B13 | 0.006 | 0.36 | 0.33 | 0.040 | 0.0033 | 11.1 | <u>0.036</u> | 1.23 | 0.35 | — |  | 7.0 |
|  | 29 | B14 | 0.002 | 0.42 | 0.42 | 0.020 | 0.0032 | 13.8 | 0.016 | <u>10.50</u> | — | 0.42 |  | 1.3 |
|  | 30 | B15 | 0.003 | 0.17 | 0.26 | 0.030 | 0.0013 | 14.2 | 0.012 | 1.50 | <u>0.56</u> | — |  | 8.5 |
|  | 31 | B16 | 0.011 | 0.52 | 0.27 | 0.020 | 0.0023 | 11.9 | 0.006 | 0.72 | — | <u>0.63</u> |  | 9.6 |
|  | 32 | B17 | 0.005 | 0.31 | 0.21 | 0.010 | 0.0016 | 13.5 | 0.010 | 1.32 | 0.11 | — | <u>Cu: 3.50</u> | 8.3 |

Underlines indicate that the values are out of the ranges of the present embodiment.

TABLE 3

| | Sample No. | Steel No. | \multicolumn{10}{c|}{Composition (by mass %) (the balance is Fe and unavoidable impurities)} | Cr/(Si + Al) |

| | Sample No. | Steel No. | C | Si | Mn | P | S | Cr | N | Al | Ti | Nb | Other elements | Cr/(Si + Al) |
|---|---|---|---|---|---|---|---|---|---|---|---|---|---|---|
| Comparative Example | 33 | B18 | 0.009 | 0.39 | 0.12 | 0.040 | 0.0022 | 14.5 | 0.013 | 1.93 | 0.23 | — | Ni: 2.60 | 6.3 |
| | 34 | B19 | 0.006 | 3.21 | 0.33 | 0.030 | 0.0007 | <u>17.3</u> | 0.016 | 0.50 | 0.35 | — | Mo: 3.50 | 4.7 |
| | 35 | B20 | 0.005 | 0.98 | 0.17 | 0.050 | 0.0011 | 13.6 | 0.013 | 0.60 | 0.15 | — | V: 1.20 | 8.6 |
| | 36 | B21 | 0.005 | 2.58 | 0.25 | 0.010 | 0.0025 | <u>16.3</u> | 0.009 | <u>0.13</u> | 0.15 | 0.27 | B: 0.0063 | 6.0 |
| | 37 | B22 | 0.002 | 0.31 | 0.65 | 0.016 | 0.0046 | 11.5 | 0.015 | 0.92 | 0.12 | 0.35 | Ca: 0.0130 | 9.3 |
| | 38 | B23 | 0.009 | 0.96 | 0.95 | 0.025 | 0.0056 | 10.9 | 0.005 | 1.83 | — | <u>0.45</u> | W: 3.60 | 3.9 |
| | 39 | B24 | 0.013 | 1.69 | 0.35 | 0.035 | 0.0076 | <u>16.5</u> | 0.013 | <u>0.12</u> | — | <u>0.45</u> | Zr: 0.52 | 9.1 |
| | 40 | B25 | 0.015 | 0.65 | 0.64 | 0.019 | 0.0009 | <u>17.5</u> | 0.015 | 1.50 | — | <u>0.58</u> | Ta: 0.16 | 8.1 |
| | 41 | B26 | 0.012 | 0.43 | 0.56 | 0.037 | 0.0016 | <u>17.6</u> | 0.009 | 1.70 | 0.15 | — | Hf: 0.19 | 8.3 |
| | 42 | B27 | 0.009 | 0.97 | 0.13 | 0.015 | 0.0016 | 10.8 | 0.005 | 2.00 | 0.12 | 0.27 | Sn: 0.60 | 3.6 |
| | 43 | B28 | 0.008 | 0.13 | 0.31 | 0.025 | 0.0013 | 14.5 | 0.015 | 1.70 | 0.12 | — | Co: 0.52 | 7.9 |
| | 44 | B29 | 0.005 | 1.26 | 0.35 | 0.026 | 0.0010 | <u>17.4</u> | 0.013 | 1.26 | 0.11 | <u>0.56</u> | Mg: 0.0260 | 6.9 |
| | 45 | B30 | 0.008 | 0.20 | 0.91 | 0.024 | 0.0010 | <u>17.5</u> | 0.011 | 1.76 | 0.12 | <u>0.47</u> | Sb: 0.73 | 8.9 |
| | 46 | B31 | 0.008 | 0.86 | 0.33 | 0.032 | 0.0015 | 13.9 | 0.015 | 1.30 | — | <u>0.45</u> | REM: 0.26 | 6.4 |
| | 47 | B32 | 0.010 | 0.35 | 0.81 | 0.053 | 0.0006 | <u>16.3</u> | 0.011 | 1.35 | <u>—</u> | <u>—</u> | Ga: 0.340 | 9.6 |
| | 48 | B33 | 0.005 | 0.10 | <u>2.90</u> | 0.032 | 0.0006 | 15.0 | 0.009 | 0.83 | 0.15 | — | | <u>16.1</u> |
| | 49 | B34 | 0.009 | 0.20 | <u>2.10</u> | 0.032 | 0.0006 | 10.7 | 0.009 | 0.95 | 0.15 | — | | 9.3 |

Underlines indicate that the values are out of the ranges of the present embodiment.

TABLE 4

| | Sample No. | Steel No. | Specific gravity (g/cm³) | Precipitation amount of AlN (%) | Al + Si concentration of surface layer of steel sheet (at %) | Presence or absence of abnormal oxidation and scale exfoliation after continuous oxidation at 850° C. for 200 hours | Total elongation at room temperature | 0.2% proof stress at 850° C. | Maximum pitting corrosion depth (corrosion resistance after heating) |
|---|---|---|---|---|---|---|---|---|---|
| Example of present invention | 1 | A1 | 7.6 | 0.003 | 15 | ○ | ○ | ○ | ○ |
| | 2 | A2 | 7.6 | 0.005 | 16 | ○ | ○ | ○ | ○ |
| | 3 | A3 | 7.6 | 0.005 | 17 | ○ | ○ | ○ | ○ |
| | 4 | A4 | 7.5 | 0.007 | 20 | ○ | ○ | ○ | ○ |
| | 5 | A5 | 7.4 | 0.008 | 21 | ○ | ○ | ○ | ○ |
| | 6 | A6 | 7.2 | 0.010 | 30 | ○ | ○ | ○ | ○ |
| | 7 | A7 | 7.6 | 0.002 | 15 | ○ | ○ | ○ | ○ |
| | 8 | A8 | 7.5 | 0.001 | 17 | ○ | ○ | ○ | ○ |
| | 9 | A9 | 7.6 | 0.001 | 16 | ○ | ○ | ○ | ○ |
| | 10 | A10 | 7.6 | 0.005 | 16 | ○ | ○ | ○ | ○ |
| | 11 | A11 | 7.6 | 0.004 | 16 | ○ | ○ | ○ | ○ |
| | 12 | A12 | 7.6 | 0.005 | 17 | ○ | ○ | ○ | ○ |
| | 13 | A13 | 7.6 | 0.005 | 15 | ○ | ○ | ○ | ○ |
| | 14 | A14 | 7.6 | 0.003 | 15 | ○ | ○ | ○ | ○ |
| | 15 | A15 | 7.6 | 0.001 | 18 | ○ | ○ | ○ | ○ |

TABLE 5

| | Sample No. | Steel No. | Specific gravity (g/cm³) | Precipitation amount of AlN (%) | Al + Si concentration of surface layer of steel sheet (at %) | Presence or absence of abnormal oxidation and scale exfoliation after continuous oxidation at 850° C. for 200 hours | Total elongation at room temperature | 0.2% proof stress at 850° C. | Maximum pitting corrosion depth (corrosion resistance after heating) |
|---|---|---|---|---|---|---|---|---|---|
| Comparative Example | 16 | B1 | <u>7.7</u> | 0.005 | 12 | x | ○ | x | x |
| | 17 | B2 | <u>7.7</u> | 0.006 | 13 | x | ○ | x | x |
| | 18 | B3 | 7.6 | 0.016 | 15 | x | ○ | x | x |
| | 19 | B4 | 7.6 | 0.011 | 16 | x | ○ | x | x |
| | 20 | B5 | 7.6 | 0.008 | 15 | ○ | ○ | x | ○ |
| | 21 | B6 | 7.5 | 0.009 | 20 | x | x | ○ | x |
| | 22 | B7 | 7.6 | 0.008 | 16 | x | x | x | x |
| | 23 | B8 | 7.4 | 0.005 | 23 | ○ | x | ○ | ○ |
| | 24 | B9 | 7.6 | 0.010 | 16 | x | x | x | x |
| | 25 | B10 | 7.6 | 0.006 | 16 | x | x | x | x |
| | 26 | B11 | 7.5 | 0.005 | 19 | x | ○ | ○ | x |
| | 27 | B12 | 7.4 | 0.005 | 20 | ○ | x | ○ | ○ |
| | 28 | B13 | 7.6 | 0.016 | 15 | x | x | x | x |
| | 29 | B14 | 7.2 | 0.015 | 31 | ○ | x | ○ | ○ |

TABLE 5-continued

| Sample No. | Steel No. | Specific gravity (g/cm³) | Precipitation amount of AlN (%) | Al + Si concentration of surface layer of steel sheet (at %) | Presence or absence of abnormal oxidation and scale exfoliation after continuous oxidation at 850° C. for 200 hours | Total elongation at room temperature | 0.2% proof stress at 850° C. | Maximum pitting corrosion depth (corrosion resistance after heating) |
|---|---|---|---|---|---|---|---|---|
| 30 | B15 | 7.6 | 0.006 | 16 | ○ | x | ○ | ○ |
| 31 | B16 | <u>7.7</u> | 0.004 | 15 | ○ | x | ○ | ○ |
| 32 | B17 | <u>7.7</u> | 0.006 | 15 | ○ | x | ○ | ○ |

Underlines indicate that the values are out of the ranges of the present embodiment.

TABLE 6

| | Sample No. | Steel No. | Specific gravity (g/cm³) | Precipitation amount of AlN (%) | Al + Si concentration of surface layer of steel sheet (at %) | Presence or absence of abnormal oxidation and scale exfoliation after continuous oxidation at 850° C. for 200 hours | Total elongation at room temperature | 0.2% proof stress at 850° C. | Maximum pitting corrosion depth (corrosion resistance after heating) |
|---|---|---|---|---|---|---|---|---|---|
| Comparative Example | 33 | B18 | 7.6 | 0.005 | 16 | ○ | x | ○ | ○ |
| | 34 | B19 | <u>7.9</u> | 0.004 | 17 | ○ | x | ○ | ○ |
| | 35 | B20 | 7.6 | 0.005 | 15 | ○ | x | x | ○ |
| | 36 | B21 | 7.5 | 0.002 | 18 | x | ○ | ○ | x |
| | 37 | B22 | <u>7.7</u> | 0.003 | 15 | x | ○ | ○ | x |
| | 38 | B23 | <u>8.0</u> | 0.005 | 16 | ○ | x | ○ | ○ |
| | 39 | B24 | 7.6 | 0.001 | 15 | ○ | ○ | x | ○ |
| | 40 | B25 | 7.6 | 0.006 | 15 | x | x | x | x |
| | 41 | B26 | 7.6 | 0.006 | 16 | x | x | x | x |
| | 42 | B27 | 7.6 | 0.005 | 16 | ○ | x | ○ | ○ |
| | 43 | B28 | 7.6 | 0.006 | 15 | x | x | ○ | x |
| | 44 | B29 | 7.6 | 0.004 | 17 | x | ○ | x | x |
| | 45 | B30 | 7.6 | 0.008 | 15 | x | x | x | x |
| | 46 | B31 | 7.6 | 0.010 | 15 | x | ○ | x | x |
| | 47 | B32 | 7.6 | 0.005 | 16 | x | x | x | x |
| | 48 | B33 | 7.6 | 0.005 | 12 | x | ○ | ○ | x |
| | 49 | B34 | <u>7.7</u> | 0.008 | 16 | ○ | ○ | ○ | ○ |

Underlines indicate that the values are out of the ranges of the present embodiment.

TABLE 7

| | Sample No. | Steel No. | Step of annealing cold-rolled sheet | | Pickling step | | | | | |
|---|---|---|---|---|---|---|---|---|---|---|
| | | | Heating temperature (° C.) | Cooling rate from 900° C. to 600° C. (° C./sec) | Immersion treatment in molten alkali salt | | Step of cooling Cooling rate after immersion in molten alkali salt (° C./sec) | Immersion treatment in nitric hydrofluoric acid solution | | | |
| | | | | | Temperature (° C.) | Immersion time (sec) | | HF concentration (g/L) | HNO₃ concentration (g/L) | Temperature (° C.) | Immersion time (sec) |
| Example of present invention | 101 | A1 | 920 | 100 | 430 | 10 | 40 | 20 | 50 | 50 | 30 |
| | 102 | A2 | 950 | 150 | 430 | 15 | 40 | 20 | 50 | 50 | 60 |
| | 103 | A3 | 940 | 200 | 400 | 30 | 20 | 15 | 30 | 40 | 10 |
| | 104 | A4 | 950 | 100 | 420 | 15 | 30 | 20 | 35 | 50 | 30 |
| | 105 | A5 | 950 | 160 | 430 | 20 | 20 | 20 | 50 | 45 | 30 |
| | 106 | A6 | 980 | 130 | 410 | 15 | 35 | 10 | 25 | 30 | 30 |
| Comparative Example | 107 | A1 | 920 | 100 | <u>450</u> | 10 | 40 | 20 | 50 | 50 | 30 |
| | 108 | A2 | 950 | 150 | 430 | <u>60</u> | 40 | 20 | 50 | 50 | 60 |
| | 109 | A3 | 940 | 200 | 400 | 30 | <u>60</u> | 15 | 30 | 40 | 10 |
| | 110 | A5 | 950 | 100 | 420 | 15 | 30 | <u>40</u> | 35 | 50 | 30 |
| | 111 | A5 | 950 | 160 | 430 | 20 | 20 | 20 | <u>80</u> | 45 | 30 |
| | 112 | A6 | 980 | 130 | 410 | 15 | 35 | 10 | <u>25</u> | <u>70</u> | 30 |
| | 113 | A1 | 920 | 100 | 430 | 10 | 40 | 20 | 50 | 50 | <u>100</u> |
| | 114 | A1 | 950 | 150 | 430 | <u>4</u> | 40 | 10 | 50 | 50 | 60 |
| | 115 | A1 | <u>880</u> | 100 | 430 | 10 | 40 | 20 | 50 | 50 | 30 |
| | 116 | A1 | 920 | <u>80</u> | 430 | 10 | 40 | 20 | 50 | 50 | 30 |

Underlines indicate that the values are out of the ranges of the present embodiment.

TABLE 8

| | Sample No. | Steel No. | Precipitation amount of AlN (%) | Al + Si concentration of surface layer of steel sheet (at %) | Presence or absence of abnormal oxidation and scale exfoliation after continuous oxidation at 850° C. for 200 hours | Maximum pitting corrosion depth (corrosion resistance after heating) | 0.2% proof stress at 850° C. | Total elongation at room temperature |
|---|---|---|---|---|---|---|---|---|
| Example of present invention | 101 | A1 | 0.003 | 15 | ○ | ○ | ○ | ○ |
| | 102 | A2 | 0.005 | 16 | ○ | ○ | ○ | ○ |
| | 103 | A3 | 0.005 | 17 | ○ | ○ | ○ | ○ |
| | 104 | A4 | 0.007 | 20 | ○ | ○ | ○ | ○ |
| | 105 | A5 | 0.008 | 21 | ○ | ○ | ○ | ○ |
| | 106 | A6 | 0.010 | 30 | ○ | ○ | ○ | ○ |
| Comparative Example | 107 | A1 | 0.003 | 10 | x | x | ○ | ○ |
| | 108 | A2 | 0.005 | 7 | x | x | ○ | ○ |
| | 109 | A3 | 0.005 | 11 | x | x | ○ | ○ |
| | 110 | A5 | 0.007 | 9 | x | x | ○ | ○ |
| | 111 | A5 | 0.008 | 12 | x | x | ○ | ○ |
| | 112 | A6 | 0.010 | 14 | x | x | ○ | ○ |
| | 113 | A1 | 0.003 | 5 | x | x | ○ | ○ |
| | 114 | A1 | 0.002 | 15 (scales remained) | x | x | ○ | ○ |
| | 115 | A1 | 0.015 | 15 | ○ | ○ | x | x |
| | 116 | A1 | 0.022 | 15 | ○ | ○ | x | ○ |

Underlines indicate that the values are out of the ranges of the present embodiment.

INDUSTRIAL APPLICABILITY

As can be clearly understood from the above description, according to the present embodiment, it is possible to provide a ferritic stainless steel sheet having a low specific gravity in which corrosion resistance and oxidation resistance are excellent, and workability is also excellent by use of a relatively low Cr component. This ferritic stainless steel sheet contributes to weight reduction of exhaust system parts and the like for which high-temperature strength and oxidation resistance are particularly required, and the social contribution thereof is significantly large.

The invention claimed is:

1. A ferritic stainless steel sheet having a low specific gravity comprising, by mass %:
   C: 0.001% to 0.020%;
   Si: 0.01% to 4.00%;
   Mn: 0.01% to 3.00%;
   P: 0.010% to 0.040%;
   S: 0.0001% to 0.0100%;
   Cr: 10.0% to 15.0%;
   N: 0.001% to 0.020%;
   Al: 0.50% to 10.0%; and
   either one or both of Ti: 0.05% to 0.40% and Nb: 0.05% to 0.40%,
   with the balance being Fe and unavoidable impurities,
   wherein Cr/(Si+Al) is 10.0 or less, and a specific gravity is 7.6 g/cm$^3$ or less,
   a precipitation amount of AlN is 0.010% or less by mass %, and
   a sum of a maximum value of an Al concentration and a maximum value of a Si concentration in a region from a steel sheet surface to a depth of 5 nm is 15 at % or more.

2. The ferritic stainless steel sheet having a low specific gravity according to claim 1, further comprising one or more of, by mass %:
   Cu: 0.01% to 3.00%;
   Ni: 0.01% to 2.00%;
   Mo: 0.01% to 3.00%;
   V: 0.01% to 0.50%;
   B: 0.0002% to 0.0050%;
   Ca: 0.0005% to 0.0100%;
   W: 0.1% to 3.0%;
   Zr: 0.01% to 0.10%;
   Ta: 0.01% to 0.10%;
   Hf: 0.01% to 0.10%;
   Sn: 0.005% to 0.50%;
   Co: 0.03% to 0.30%;
   Mg: 0.0002% to 0.010%;
   Sb: 0.005% to 0.50%;
   REM: 0.002% to 0.20%; and
   Ga: 0.0002% to 0.30%.

3. A method for producing the ferritic stainless steel sheet having a low specific gravity according to claim 1, the method comprising:
   a step of annealing a cold-rolled sheet; and
   a pickling step that is performed after the step of annealing the cold-rolled sheet,
   wherein in the step of annealing the cold-rolled sheet, an annealing temperature is set to be 900° C. or higher, and a cooling rate from 900° C. to 600° C. is set to be 100° C./sec or more, and
   in the pickling step, first, the cold-rolled sheet is immersed in a molten alkali salt at a temperature of 440° C. or lower for 5 seconds to 30 seconds, and thereafter, the cold-rolled sheet is cooled to room temperature at a cooling rate of 50° C./sec or less, and next, the cold-rolled sheet is immersed in a nitric hydrofluoric acid solution in which an amount of hydrofluoric acid is 10 to 30 g/l and an amount of nitric acid is 20 to 60 g/l at a temperature of 30° C. to 60° C. for 10 seconds to 60 seconds thereby producing the ferritic stainless steel sheet according to claim 1.

* * * * *